United States Patent Office 3,316,314
Patented Apr. 25, 1967

3,316,314
PREPARATION OF 1,5,9-CYCLODODECATRIENE
Cornelis E. P. V. van den Berg, Geleen, Netherlands, assignor to Stamicarbon N. V., Heerlen, Netherlands
No Drawing. Filed Feb. 10, 1966, Ser. No. 526,347
Claims priority, application Netherlands, Feb. 10, 1965, 6,501,602
9 Claims. (Cl. 260—666)

This invention relates to a process and catalyst composition for the preparation of 1,5,9-cyclododecatriene by the trimerization of butadiene.

It is known that 1,5,9-cyclododecatriene can be prepared by the trimerization of butadiene in a solvent in the presence of the catalyst combination of a titanium halide and an alkyl aluminum halide. In place of the alkyl aluminum halide, trialkyl aluminum and dialkyl aluminum hydride may also be used with the titanium halide. This combination of catalysts is taught, for instance, by German Patents 1,050,333 and 1,056,123.

It is also possible in the butadiene trimerization process to use catalysts obtained by combining titanium tetrachloride, aluminum trichloride and diethyl aluminum hydride, as taught by German Patent 1,085,523, or by combining titanium tetrachloride, aluminum trichloride and triethyl aluminum, as taught by British Patent 903,651.

An undesired side reaction in the trimerization of butadiene is the polymerization of the butadiene to high molecular weight products. German Patent 1,109,674, the disclosure of which is incorporated herein by reference, teaches that this undesired polymerization of butadiene can be reduced by adding to the catalyst combination a further metal belonging to the first, second and third groups of the Periodic Table, or complex-forming compounds thereof, particularly the salts of alkali metals or alkaline earth metals.

It is an object of this invention to provide a process for the trimerization of butadiene to 1,5,9-cyclododecatriene whereby high yields may be obtained and the formation of high molecular weight products is reduced. It is a further object of this invention to provide a catalyst composition for use in the solvent trimerization of butadiene to 1,5,9-cyclododecatriene whereby high yields are obtained and the formation of high molecular products is reduced. Still further objectives and the entire scope of applicability of the present invention will become apparent from the detailed description given hereinafter; it should be understood, however, that the detailed description and specific examples, while indicating preferred embodiments of the invention, are given by way of illustration only, since various changes or modifications within the separate and scope of the invention will become apparent to those skilled in the art from this detailed description.

It has now been found that, in the preparation of 1,5,9-cyclododecatriene by the trimerization of butadiene in a solvent, high yields are obtained and the formation of high molecular weight products is reduced if ferric chloride is added to the catalyst combination of titanium tetrachloride, aluminum trichloride and an alkyl aluminum compound.

The ferric chloride-containing catalyst combination of this invention has increased activity, so that a larger amount of 1,5,9-cyclododecatriene is obtained per mole of alkyl aluminum compound per unit of time. The amount of ferric chloride added may be varied from 0.1 to 5 moles and more of ferric chloride per mole of alkyl aluminum compound. Preferably, 0.5 to 2 moles of ferric chloride per mole of alkyl aluminum compound are used. Small amounts such as 0.1 to 0.5 mole of ferric chloride per mole of alkyl aluminum compound will give favorable results but the activity of the catalyst will not be as great as if more than 0.5 mole of ferric chloride per mole of alkyl aluminum compound is used. The use of very large amounts of ferric chloride, e.g., 3 to 5 moles and more of ferric chloride per mole of alkyl aluminum compound, also produces a catalyst with high activity but there is no need of using such large amounts of ferric chloride, which may adversely effect the cost of the trimerization process.

The amount of alkyl aluminum compound used may also be varied with respect to the amount of titanium tetrachloride in the catalyst composition. Generally, at least 1 mole of alkyl aluminum compound per mole of titanium tetrachloride is needed to obtain the trimerization product. Preferably, 2 to 3 moles of alkyl aluminum compound per mole of titanium tetrachloride are used. While larger amounts of alkyl aluminum compound per mole of titanium tetrachloride may be used, the cost of the trimerization process will be adversely effected. Most of the alkyl aluminum compounds may be used in the catalyst composition of this invention, suitable examples of which are trialkyl aluminum, alkyl aluminum hydride and alkyl aluminum halide, the alkyl groups of which generally contain less than 6 carbon atoms. Preferred alkyl aluminum compounds are di-isobutyl aluminum hydride and tri-isobutyl aluminum.

0.5 to 2.5 moles of aluminum trichloride per mole of alkyl aluminum compound may be used, although preferably about equimolecular amounts of aluminum trichloride and alkyl aluminum compound are used.

The trimerization of butadiene is effected in a solvent, suitable examples of which are hydrocarbons, in particular aromatic hydrocarbons, such as benzene, toluene and mixtures thereof with other hydrocarbons, and chlorobenzene and cyclohexane. Cyclodecatriene can also be used as the reaction solvent.

In carrying out the trimerization process, the catalyst component can be simultaneously added to the solvent, after which the butadiene may be introduced. It is recommended that the reaction between the components of the catalyst combination, i.e., the reduction of the titanium tetrachloride, take place before butadiene is brought into contact with the catalyst combination. This reaction between the catalyst components may also take place in the absence of the ferric chloride, which may be added later.

The trimerization process using the novel catalyst composition of this invention may be carried out in the known way at a temperature from 10 to 150° C., making allowance for the exothermic character of the trimerization reaction in controlling the temperature. Preferably, the reaction is at a temperature of 50 to 80° C.

The butadiene trimerization process preferably is effected by bubbling or otherwise passing butadiene through the catalyst-containing solvent at a rate such that unreacted butadiene is always contained in the gas discharged from the reactor. The reaction time and the weight of 1,5,9-cyclododecatriene produced per weight of catalyst composition may vary widely, depending upon the temperature and such facts as the economic balance between the cost of the catalyst composition and the price of butadiene and 1,5,9-cyclododecatriene. Generally, however, when the reaction is at the preferred temperature of 50 to 80° C., the reaction time will be about ½ to 3 hours. While a substantial excess of butadiene may be passed through the reactor, it is preferable to allow only a slight excess of unreacted butadiene to escape with the exit gas—i.e., less than 20% of the total butadiene fed to the reactor.

The invention will be more clearly understood from the following examples, in which the term "millimole" stands for $1/1000$ gram molecule, and weight percents are based on total product weight.

Example I

In a 2 liter reaction vessel provided with a feeder, stirrer, a thermometer, a gas distributor and a discharge pipe, 8.5 millimoles of tri-isobutyl aluminum were dissolved under nitrogen in 375 ml. of benzene. 3.4 millimoles of titanium tetrachloride were added, with simultaneous stirring, and the mixture was stirred for 15 minutes at a temperature of 40° C.

After that, 7.6 millimoles of pulverulent aluminum trichloride and 7.6 millimoles of anhydrous ferric chloride were stirred into the mixture. The trimerization was carried out at atmospheric pressure. Butadiene was fed to the reaction vessel wherein the temperature was kept at 50 to 60° C. The supply of butadiene was controlled so that the gas discharged always contained unreacted butadiene.

After 1 hour the supply of butadiene was stopped. The catalyst was deactivated by the addition of 10 ml. of methanol and was removed from the reaction product by washing with water. 2.7 weight percent (based on total product weight) of high molecular weight product formed (rubber) was then coagulated by adding the reaction product to 2 liters of acetone, and then the coagulated rubber was separated off, for example, by filtering.

94.3 weight percent of 1,5,9-cyclododecatriene product was separated from 3.0 weight percent of the higher boiling residue by distillation. 33.2 grams of cyclododecatriene were obtained per millimole of alkyl aluminum compound, which corresponds to a rate of 33.2 grams of cyclododecatriene per millimole of alkyl aluminum compound per hour.

Examples II–IX

A number of experiments using di-isobutyl aluminum hydride as the alkyl aluminum compound were carried out in the manner set forth in Example I but with the molar ratio between the catalyst components varied. The results are set forth in Table I, wherein the catalyst components are indicated by the following figures:

I = di-isobutyl aluminum hydride
II = titanium tetrachloride
III = aluminum trichloride
IV = ferric chloride

I claim:

1. In a process for the preparation of 1,5,9-cyclododecatriene by the trimerization of butadiene in a solvent in the presence of a catalyst combination comprising titanium tetrachloride, aluminum trichloride, and an alkyl aluminum compound, the improvement consisting essentially in the addition of at least 0.1 mole of ferric chloride per mole of alkyl aluminum compound to the catalyst composition.

2. The process of claim 1, wherein the alkyl aluminum compound is selected from the group consisting of trialkyl aluminum, alkyl aluminum hydride and alkyl aluminum halide compounds.

3. Process according to claim 2, wherein 0.5 to 2 moles of ferric chloride are present per mole of alkyl aluminum compound.

4. Process according to claim 3, wherein 2 to 3 moles of alkyl aluminum compound are used per mole of titanium tetrachloride.

5. Process according to claim 3, wherein 0.5 to 2.5 moles of aluminum chloride are used per mole of alkyl aluminum compound.

6. The process of claim 3, wherein the alkyl aluminum compound is selected from the group consisting of di-isobutyl aluminum hydride and tri-isobutyl aluminum.

7. A catalyst composition for the trimerization of butadiene to cyclododecatriene comprising titanium tetrachloride, at least one mole of alkyl aluminum compound per mole of titanium tetrachloride, 0.5 to 2.5 moles of aluminum trichloride per mole of alkyl aluminum compound, and at least 0.1 mole of ferric chloride per mole of alkyl aluminum compound.

8. The composition of claim 7, wherein there are 0.5 to 2 moles of ferric chloride per mole of alkyl aluminum compound.

9. The composition of claim 8, wherein there are about equal molecular amounts of aluminum trichloride and alkyl aluminum compound and 2 to 3 moles of alkyl aluminum compound per mole of titanium tetrachloride.

TABLE I

| Ex. | Catalyst (millimoles) | | | | Percent by weight of rubber | Percent by weight of residue | Cyclododecatriene | | | Reaction time (hours) |
|---|---|---|---|---|---|---|---|---|---|---|
| | I | II | III | IV | | | Percent by weight | Obtained in reaction time (g.) | Obtained per hour (g.) | |
| 2 | 8.5 | 6.8 | 7.6 | ----- | 9.6 | 5.7 | 84.7 | 24.1 | 24.1 | 1 |
| 3 | 8.5 | 6.8 | 7.6 | 2.6 | 8.6 | 4.1 | 87.3 | 38.3 | 19.2 | 2 |
| 4 | 8.5 | 6.8 | 7.6 | 7.6 | 8.6 | 3.2 | 88.2 | 57.2 | 28.6 | 2 |
| 5 | 8.5 | 3.4 | 7.6 | 3.8 | 4.1 | 4.2 | 91.7 | 43.6 | 43.6 | 1 |
| 6 | 8.5 | 3.4 | 7.6 | 7.6 | 3.2 | 2.1 | 94.7 | 59.5 | 59.5 | 1 |
| 7 | 8.5 | 3.4 | 7.6 | 11.4 | 3.4 | 3.5 | 93.1 | 56.8 | 75.7 | ¾ |
| 8 | 8.5 | 3.4 | 7.6 | 15.2 | 4.3 | 2.8 | 92.9 | 48.6 | 48.6 | 1 |
| 9 | 8.5 | 3.4 | 7.6 | 22.8 | 5.4 | 8.0 | 86.6 | 42.2 | 42.2 | 1 |

No references cited.

DELBERT E. GANTZ, *Primary Examiner.*

V. O'KEEFE, *Assistant Examiner.*